(12) United States Patent
Lopez et al.

(10) Patent No.: US 6,318,983 B1
(45) Date of Patent: Nov. 20, 2001

(54) MOLDING ELEMENT FOR TIRE

(75) Inventors: Jose Merino Lopez; Georges Peyron, both of Riom; Jean-Claude Kaczorwski, Malauzat; Georges Lavialle, Billom, all of (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/522,647

(22) Filed: Mar. 10, 2000

(30) Foreign Application Priority Data

Mar. 10, 1999 (FR) .................................................. 99 03052

(51) Int. Cl.$^7$ .................................................. B29D 30/68
(52) U.S. Cl. ........................... 425/28.1; 425/46; 425/438; 425/DIG. 58
(58) Field of Search .............................. 425/28.1, 35, 46, 425/438, DIG. 58

(56) References Cited

U.S. PATENT DOCUMENTS

| | | |
|---|---|---|
| 1,733,064 | 10/1929 | Lambert . |
| 5,022,448 | 6/1991 | Ochiai . |
| 5,198,244 | 3/1993 | Rice . |
| 6,193,492 * | 2/2001 | Lagnier et al. ..................... 425/28.1 |

FOREIGN PATENT DOCUMENTS

| | | |
|---|---|---|
| 19612829 | 10/1997 | (DE) . |
| 0858875 | 8/1998 | (EP) . |
| 0873851 | 10/1998 | (EP) . |
| 2772663 | 6/1999 | (FR) . |

* cited by examiner

Primary Examiner—James P. Mackey
(74) Attorney, Agent, or Firm—Baker Botts L.L.P.

(57) ABSTRACT

A molding element for equipping a mold for molding a rubber tread, composed of at least two molding parts provided with lateral walls and end walls joining the lateral walls, the lateral walls being intended to mold in the rubber tread main walls defining a cutout, the main walls being connected by at least one rubber connecting element. In the molding position, the molding parts of the molding element are arranged such that one wall of a molding part is in contact with at least one wall of another molding part, the geometries of the walls of the molding parts being functionally arranged to form at least one orifice permitting the passage of the rubber for molding a connecting element. At least one of the molding parts is mounted to be mobile relative to the molding part with which it defines at least one orifice, such that, under the action of the demolding forces, the mobile part is displaced relative to the other to create a passage sufficient to permit the molded connecting element(s) to pass and thus to permit demolding of the rubber tread in a single operation without breaking the connecting elements.

10 Claims, 4 Drawing Sheets

MOLDING ELEMENT FOR TIRE

BACKGROUND OF THE INVENTION

The invention relates to a novel type of molding element intended to be fitted in a mold for molding a cutout in a rubber tread intended, for example, for a tire; the invention also relates to molds equipped with this type of molding element.

In FR 2 759 321, there is proposed a mold for molding a tread of a tire, this tread comprising a tread pattern provided with incisions, the main walls defining the incisions being connected by at least one connecting bridge so as to maintain a satisfactory level of rigidity for said tread. The mold described in this application is formed of two parts which come into contact with each other in the molding position and each part bears at least one molding element for molding, an incision. In the molding configuration, certain of said molding elements of one mold part are in contact with certain molding elements of the other mold part, their end walls cooperating to form orifices intended to allow the rubber to pass during molding and thus to mold the bridges connecting the walls of the incision. After molding, it is possible to open the two mold parts without breaking said rubber bridges.

Although this technique does make it possible to produce connecting elements between the walls of a cutout, it however requires manufacturing the tread separately before assembling it with suitable means on a tire without a tread to finish the manufacture of said tire. An additional operation is then necessary to join the tread to the tire thus covered. It is therefore costly owing to the large number of operations, and requires very special attention in the transport and assembly phases for forming the tire.

In another French application, 98-08653, there was proposed a molding element for molding a rubber block in a tread, the lateral surface of said block being connected to the tread by at least one rubber connecting bridge. This molding element comprises molding blades mounted on a head which can turn about an axis substantially parallel to the direction of molding/demolding of the mold part equipped with said molding element. To obtain connecting bridges connecting the walls of the rubber block, it was proposed, for example, to arrange two series of blades on two concentric cylinders, each blade of a cylinder being crossed and in contact with blades of the other cylinder so as to define, in the molding configuration, orifices permitting the molding of said bridges. During the demolding under the action of the displacement of the mold part bearing this molding element, the vulcanized rubber exerts contact actions which force the cylinders bearing the blades to turn relative to each other. This process. notwithstanding that it is highly advantageous and achieves high-performance, once the number of molding elements becomes very large, requires a very great demolding force which increases the complexity of production of the apparatus in displacing the mold parts during the demolding operation.

This problem is furthermore a general problem which arises when the number of molding elements becomes very large, whatever their structure (this is a current tendency in all categories of tires for passenger vehicles or heavy vehicles).

SUMMARY OF THE INVENTION

The object of the invention is to propose an element molding a cutout in a tread which makes it possible to obtain a cutout, the rubber walls of which defining said cutout are connected together by at least one rubber bridge, said molding element not having the disadvantages which have been mentioned above. In particular, a molding element according to the invention permits a reduction in the costs of manufacturing a tread provided with cutouts of this type by reducing the number of manufacturing operations and by permitting demolding without there being any breaking of the connecting bridges, while reducing the forces necessary for this demolding operation.

"Demolding" is understood to mean that, by the mere opening movement of the mold part bearing the molding element according to the invention, it is possible completely to extract said molding element from the tread once said tread has been molded.

To this end, the molding element according to the invention intended to mold a cutout in a rubber tread is composed of at least two molding parts intended to project on the molding surface of a mold for molding said tread. Each molding part is provided with lateral walls and end walls limiting said lateral walls. Said molding parts are functionally arranged between them to define, in the molding configuration, at least one orifice intended for molding a rubber connecting bridge between the walls of the cutout.

The molding element is characterized in that at least one molding part is mounted to be mobile at least in translation in the direction of demolding relative to the other molding parts of said element so as to form, during a first phase of the demolding, at least one passage of sufficient dimensions to allow the connecting bridges molded in the final phase of demolding to pass in order to permit complete demolding of the molding element from the molded tread without breaking said bridges.

During this final phase of the demolding, the molding part or parts of the molding element which have remained in the tread are entrained by the mold for molding the tread and will force the rubber connecting bridges to deform sufficiently to permit said parts to emerge from the tread.

In a first variant, the molding element according to the invention is composed of at least two molding parts intended to project on the molding surface of a mold for molding said tread, each molding part being provided with lateral walls and end walls joining the lateral walls, the lateral walls being intended to mold in the tread the main walls defining said cutout, said main walls being connected by at least one rubber connecting bridge.

In the molding position, the molding parts of the molding element are arranged so that one wall of a molding part is in contact with a wall of another molding part, the geometries of the end walls of said molding parts being functionally arranged to define at least one orifice permitting the rubber to pass during molding for molding a connecting bridge between the walls of the cutout.

This molding element is characterized in that: at least one of the molding parts is mounted to be mobile relative to the molding part with which it defines at least one orifice, such that, under the action of the demolding forces exerted by the rubber after vulcanization, each molding part is displaced relative to the other molding parts to create at least one passage of sufficient dimensions to allow each molded connecting bridge to pass and thus to permit the demolding of the rubber tread in a single operation without breaking the rubber bridge(s).

Depending on the geometry of the desired cutout and the geometry of that of the rubber bridges between the main walls of said cutout (both the form of the cross-sections of said bridges and their distribution), it is advantageous to provide for the mobile part of the molding element to comprise an end wall arranged to be able to move relative to another part of the molding element, while remaining in contact with an end wall of said other part (said wall of the other part acting as a guide ramp for the displacement of the mobile part during demolding). If the angle, other than zero, formed by the guide ramp with the direction of demolding is referenced cc, the greater this angle α (yet always remaining less than 45°) the more the passage formed is widened, the result of which is to make demolding easier.

In another variant, a molding element according to the invention may furthermore comprise at least one molding part mounted to be mobile in rotation relative to at least one other molding part, for example in the event that a molding part comprises at least one blade wound in a helix for molding an incision of helicoidal shape.

A molding element according to the invention may be used equally well in a mold for molding a tire or in a mold for molding a tread intended, for example, for recapping a tire.

Other possibilities and advantages of the molding element according to the invention will be provided with the description of the following drawings, the aim of which is to present variant embodiments in non-limitative manner.

DESCRIPTION OF PREFERRED EMBODIMENTS

Figure 1A:
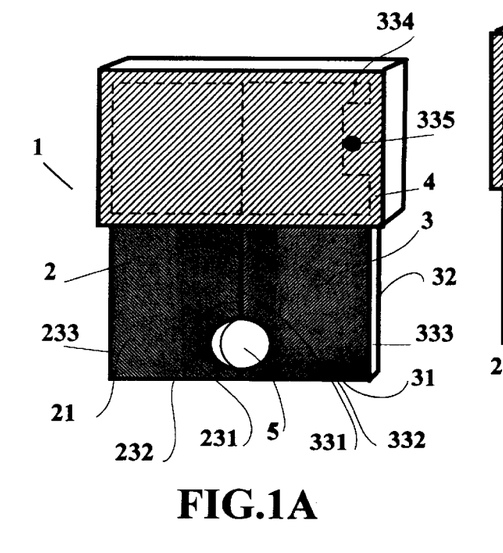
FIGS. 1A and 1B show a first variant of a molding element according to the invention comprising three assembled pieces, one of which is mounted to be mobile and intended to mold a planar incision, the walls of which are connected by a rubber connecting bridge.

In FIG. 1A, there can be seen a molding element 1 intended to equip a mold for molding a tire tread. This molding element 1 is intended for molding in the rubber tread a cutout defined by two main walls connected by a rubber bridge. This molding element 1 is formed of a first part forming the support 4 for said element which is intended to be anchored in the mold, and two molding parts 2, 3 assembled with the support 4. The support 4 is, for example, formed of two planar pieces assembled so as to form a space between said pieces within which the molding parts 2 and 3 are introduced to assemble the molding element 1.

The molding parts 2 and 3 are in the form of thin plates having planar, parallel lateral walls 21, 22 and 31, 32 respectively, said walls being limited by end walls 231, 232, 233 and 331, 332, 333 respectively. In the molding configuration illustrated in FIG. 1A, the molding parts 2, 3 are in contact along their end walls 231 and 331, while the end walls 232, 233, 332, 333 form the outer contour of the molding parts of the molding element 1.

The molding part 2 is mounted in the support 4 of the molding element 1 and is fastened to said support by suitable means, so as to be integral with said support in all its movements.

The molding part 3 is positioned within the support 4 so as to be adjacent to the molding part 2 while being mobile relative to said support and to said molding part 2. To permit the movement of the molding part 3, the end wall 333 comprises, on the side opposite the end wall 332, a shoulder 334 which cooperates with an axis 335 passing through the support from side to side to restrict the path of said molding part 3 within the support 4.

During movement of the molding part 3 relative to the support 4, the lateral wall 331 of the molding part 3 remains bearing against/in contact with the lateral wall 231 of the molding part 2, which ensures guidance of the molding part 3.

In the molding position illustrated in FIG. 1A, the molding parts 2 and 3 which are in contact by their end walls 231, 331 define an orifice 5 passing through the molding element 1. This orifice 5 is intended to allow the rubber to pass during the molding of a cutout in a rubber tread to form a connecting bridge between the walls of the cutout which is molded by the molding element.

Figure 1B:
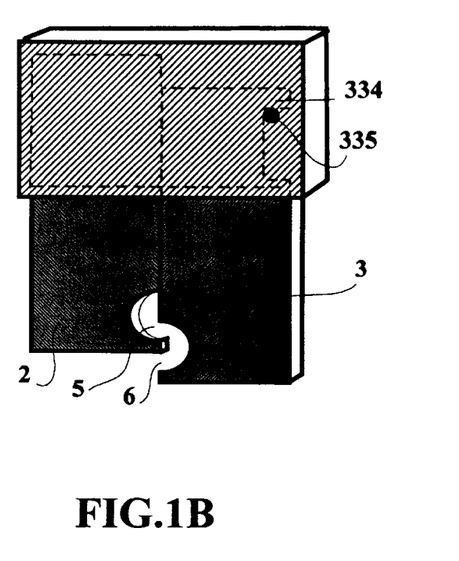

In FIG. 1B, the same element is shown in the demolding configuration in which the support 4 and the molding part 2 have moved relative to the molding part 3 which is mobile according to the demolding movement. In this position, the orifice 5 is no longer completely limited by the walls 231 and 331 of the molding parts 2 and 3, and a passage 6 forms which is of sufficient dimensions to permit the rubber connecting bridge to pass and hence demolding without breaking said bridge.

When this molding element is within a tread and in the first phase of demolding, the rubber bridge molded in the orifice 5 exerts forces on the molding parts 2 and 3 which tend to oppose the demolding of the molding element 1; however, taking into account the elastic nature of the vulcanized rubber, the molding part 2 moves with the support of the molding element relative to the molding part 3 in the direction of demolding of the molding element 1. There then forms a passage 6 sufficient to allow the molded rubber bridge to pass, which bridge undergoes elastic deformation which is not detrimental to its integrity (that is to say, without causing breaking of said bridge).

Note that during the molding phase, the molding element penetrates into non-vulcanized rubber and the forces exerted by said rubber on the end walls 232 and 332 tend to reform the molding element as shown in FIG. 1A. It is also possible to provide complementary means to return the molding element to its molding configuration (for example, elastic return elements incorporated in the molding element which automatically bring the mobile molding parts back into the desired configuration for molding or any other mechanical means external to said molding element).

Depending on the desired position of the orifices, it may be necessary to provide that, for a given displacement, in the direction of demolding represented by the arrow X, the dimensions of the passage 6 formed by the relative movement of the two molding parts 2 and 3 are as large as possible; for this, it is advantageous for each mobile molding part to be able to move both in the direction XX' and in a direction perpendicular to the direction XX', marked Y in the drawings.

Figure 2A:
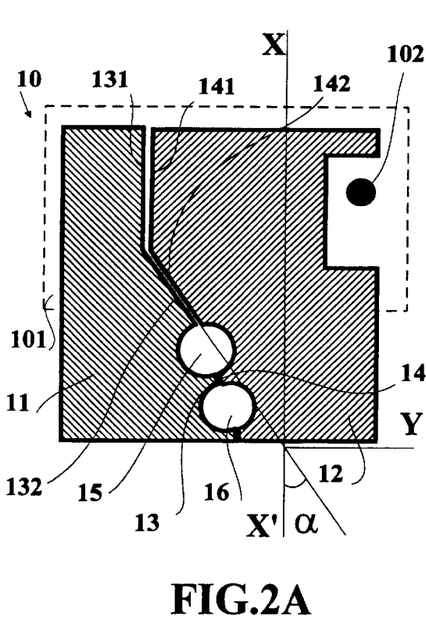
FIGS. 2A and 2B show another variant of a molding element according to the invention formed by assembling three pieces to mold an incision the walls of which are connected by two connecting elements arranged obliquely to a direction substantially perpendicular to the running surface of the tread.
Figure 2B:
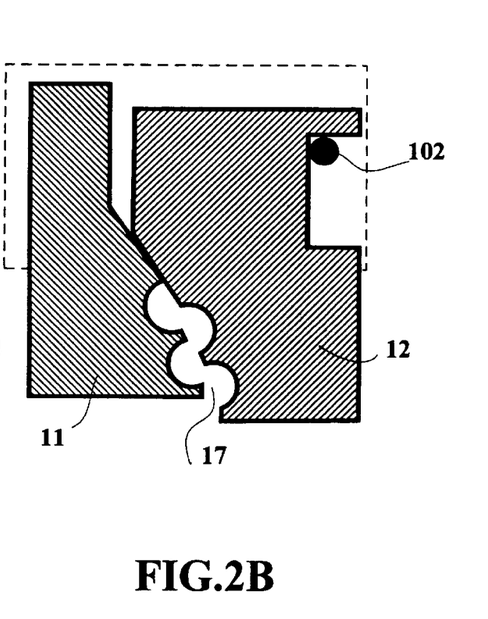

An example of a molding element having this arrangement is shown diagrammatically in FIGS. 2A and 2B.

FIG. 2A shows, in the molding configuration, an element 10 molding a cutout, said element being formed of two planar molding parts 11, 12 provided to be mounted in a support 101, here represented in broken lines. These two molding parts have two end walls 13, 14 which are in contact and form two orifices 15, 16 intended to permit passage of the rubber for molding two rubber connecting bridges arranged obliquely. Each end wall 13, 14 is formed of two walls in the extension of one another, a first wall, 131, 141 respectively, the sections of which in the plane of the drawing are oriented in a direction parallel to the direction XX' corresponding to the direction of demolding and a second wall, 132, 142 respectively, inclined relative to this same direction by an angle α.

In the case of this molding element 10, and as can clearly be seen in FIG. 2B, the demolding of this element causes, firstly, displacement of the mobile part 11 relative to the part 12 mounted to be mobile in the support. This relative displacement is effected such that the end walls 13 and 14 remain in contact along their inclined parts 132 and 142. By this means, displacement of the mobile part 12 relative to the molding element is effected, comprising both a component of displacement along XX' and a component of displacement in a direction Y located in the plane of the drawing and perpendicular to the direction XX'.

This component of displacement along Y is greater, the greater the angle α.

During demolding, a passage 17 is formed which enables the two molded rubber bridges to emerge. The component of displacement of the molding part 12 relative to the molding part 11 very substantially increases the dimensions of the passage 17, which may be beneficial for easier demolding and for less stress on the rubber bridges.

As has been mentioned for the molding element shown in FIGS. 1A and 1B, means 102 are provided to limit the path of the molding part 12 within the support 101.

Figure 3A:
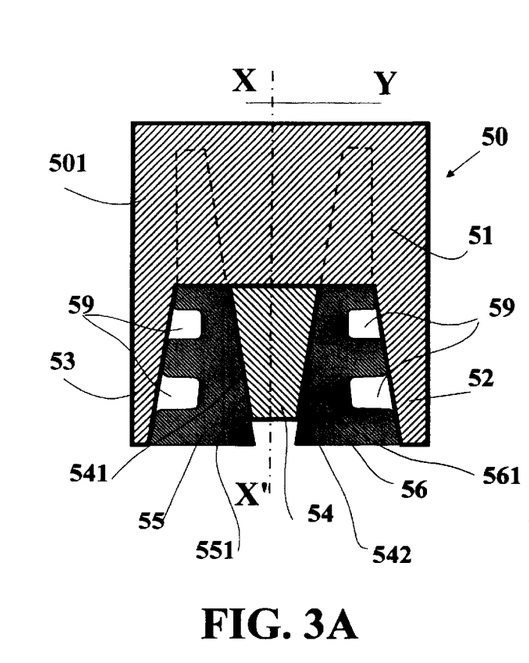
FIGS. 3A and 3B show a variant of a molding element for molding a cutout the walls of which are connected by four connecting elements, said element comprising two mobile molding parts.
Figure 3B:
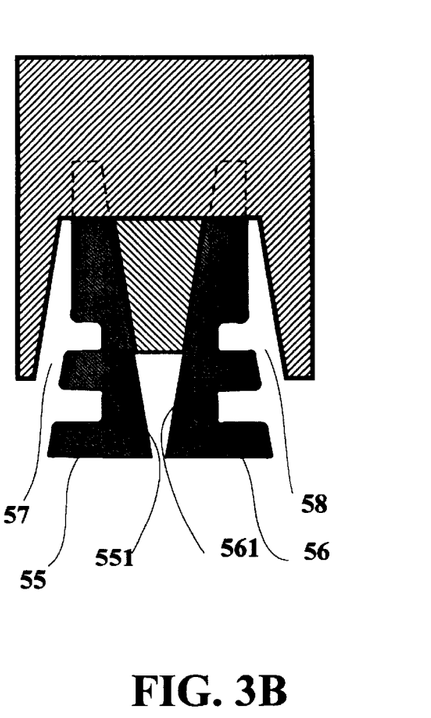

FIGS. 3A and 3B show another variant of a molding element 50 according to the invention making it possible to mold a planar cutout defined by two substantially parallel main walls, said cutout being provided with four connecting bridges connecting said walls. In this variant, the molding element 50 comprises a support 501, part 51 of which is of substantially rectangular shape and intended to be fixed in a mold for molding a tread of a tire and which is extended by two extensions 52, 53 projecting over the molding surface of said mold.

The support 501 of the molding element 50 has a groove within which there are mounted:

an intermediate molding part 54 extending in the direction of the extensions 52, 53; this part 54 is mounted to be fixed relative to said support and is provided with two end walls 541, 542, the traces of which on the cutting plane are inclined relative to the direction XX' of the molding element corresponding substantially to the direction of molding/demolding of the mold part provided with the molding element 50;

two molding parts 55, 56 mounted to be mobile relative to the intermediate part 54 and to the support 501; these two mobile molding parts 55, 56 comprise end walls 551, 561 the profiles of which are suitable for defining two orifices 59 with each extension 52, 53 in the molding position. Furthermore, these same mobile molding parts 55, 56 are in sliding contact with the end walls 541, 542 of the intermediate part 54, the role of which is to act as a guide for said mobile molding parts 55, 56 during the demolding, as can clearly be seen in FIG. 3B.

In FIG. 3B showing the molding element in a first demolding phase, it appears that the molding element 50 and its support 501 with the intermediate part 54 have followed the demolding movement of the mold and have moved in the direction XX' (direction of demolding), whereas the molding parts 55, 56 have remained in place, taking into account the presence of the connecting bridges.

During this first phase of demolding, the orifices 57, 58 were formed to mold rubber connecting bridges. After molding, and due to the elasticity of deformation of the vulcanized rubber, it is possible to extract the molding parts 55 and 56 from the rubber without breaking said rubber bridges.

Means, not shown, are of course provided to restrict the relative path of displacement of the mobile parts 55 and 56 relative to the support of the molding element.

Other embodiments may also be envisaged, such as, for example, the one in which the intermediate part 54 forms part of the support 501 or the one in which orifices are provided between the part 54 and at least one of the mobile molding parts.

Within the spirit of the invention, one of the parts of the molding element which is mobile in translation relative to at least one other part may be integrated directly in a mold part and be, for example, made in the form of a rib integral with the mold.

Figure 4A:
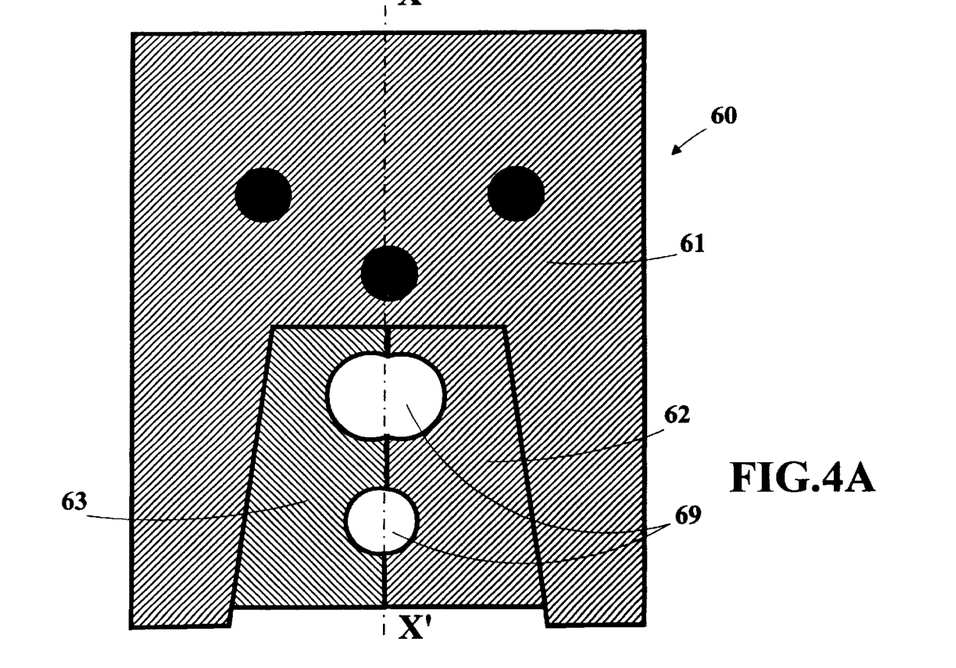
FIGS. 4A, 4B and 4C show a variant of a molding element in which there are provided means forcing two mobile molding parts to move apart at the start of demolding.
Figure 4B:
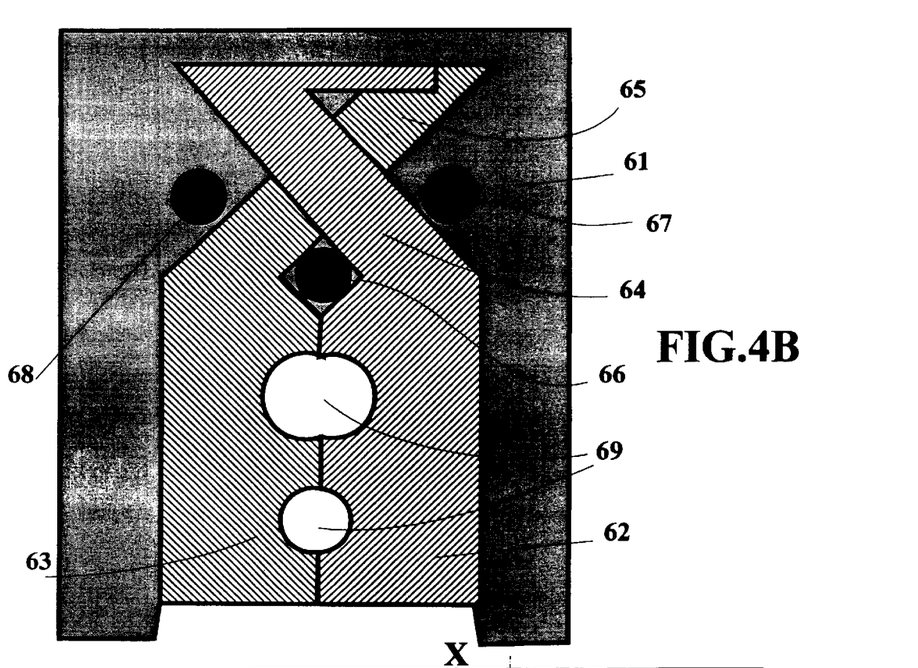
Figure 4C:
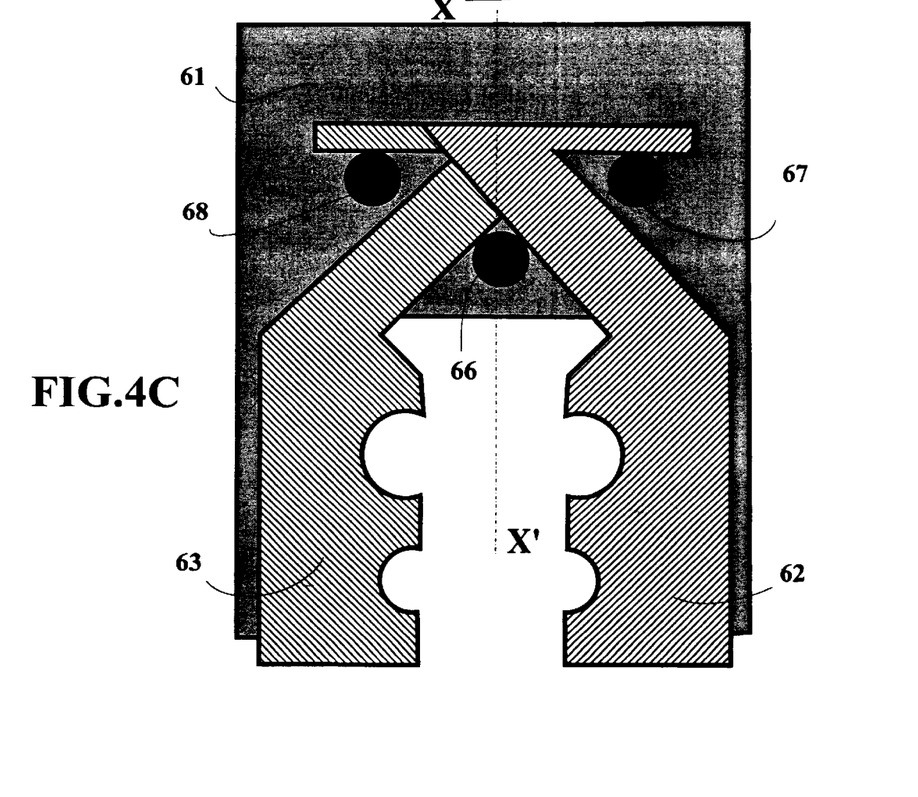

FIGS. 4A, 4B, 4C show another variant of a molding element 60 according to the invention in which means are furthermore provided within said molding element to force each mobile molding part of said element to move apart sufficiently from the molding part with which it defines at least one orifice to form a passage permitting demolding.

In FIG. 4A, a molding element 60 is shown in the molding configuration; this element is composed of two mobile planar molding parts 62, 63 which are mounted in a groove provided on a support 61, one part of which is intended to mold part of an incision, one of the main dimensions of said support defining the direction XX' corresponding to the preferred direction of molding/demolding of said element when the latter is fitted on a mold for molding a tread for a tire.

The molding parts 62, 63 in contact along two of their end walls define two orifices 69 for molding two rubber connecting bridges between the walls of the incision molded by the molding element 60.

FIG. 4B shows a section taken at mid-thickness through the same molding element 60 and in the same molding configuration. In this FIG. 4B, it is observed that each mobile molding part 62, 63 comprises respectively an extension 64, 65 oriented obliquely to the direction XX'. The extensions 64 and 65 pass respectively between axes 66, 67 and 66, 68 passing through the support from side to side. At the time of demolding, the mold part to which the molding element 60 is fixed entrains the support 61 in its movement along XX', while the molding parts 62, 63, under the action of the rubber bridges, are forced to remain in the rubber of the tread. In this first phase, the axis 66 located in the central position exerts a force in the direction XX' on each extension 64, 65 and forces the molding parts to move apart to form a passage freeing the connecting bridges molded in the orifices 69. We should state that this movement apart is possible due to the elastically deformable nature of the molded, vulcanized rubber.

The position reached at the end of demolding is shown in FIG. 4C, in which there can be seen the molding parts 62, 63 which, on moving in the direction XX', have moved apart in a direction perpendicular to the direction XX' under the action of the median axis 66 to permit complete demolding without breaking the connecting bridges. The two axes 67, 68 serve both as a guide for the displacement of the extensions 64, 65 and as a stop for stopping the displacement of the mobile molding parts 62, 63.

Conversely, the forces exerted by the rubber at the moment of penetration of the molding element 60 into the material to be molded cause the mobile molding parts 62, 63 to move towards each other until the molding configuration of FIGS. 4A and 4B is regained. To facilitate this movement, it is possible to add to this molding clement elastic return elements which come back into action once said molding element has been completely demolded.

The variants of molding elements according to the invention which have been described may of course have geometries which are not necessarily planar, such as curved, undulating or zigzag geometries.

Figure 5A:
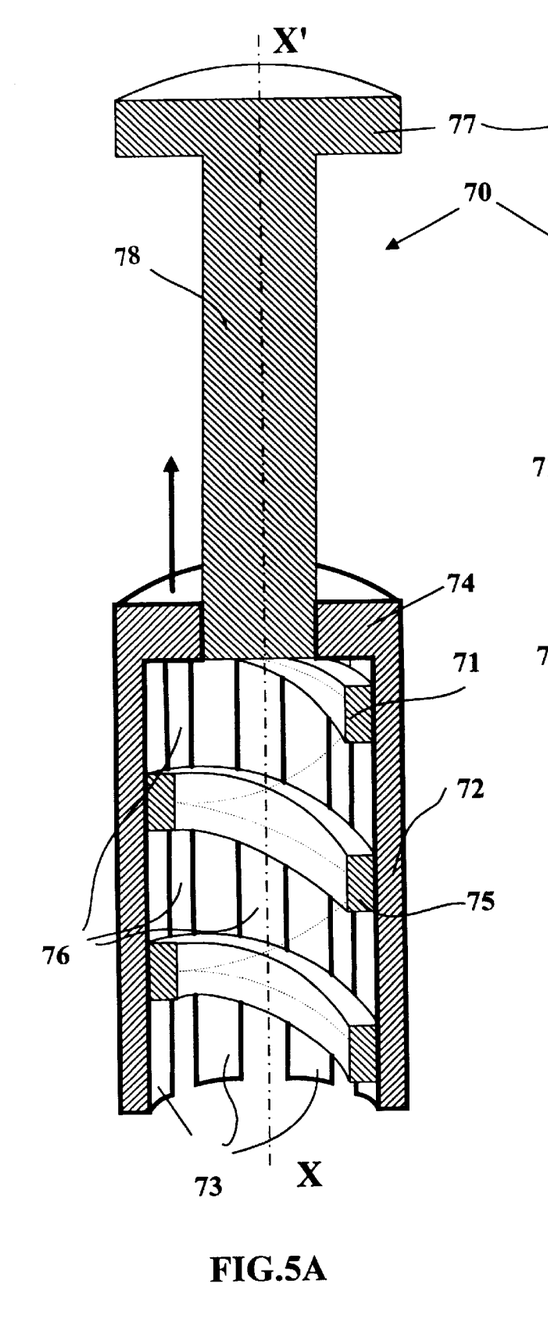
FIGS. 5A and 5B show another variant of a molding element according to the invention comprising a molding part which can turn about an axis of rotation.
Figure 5B:
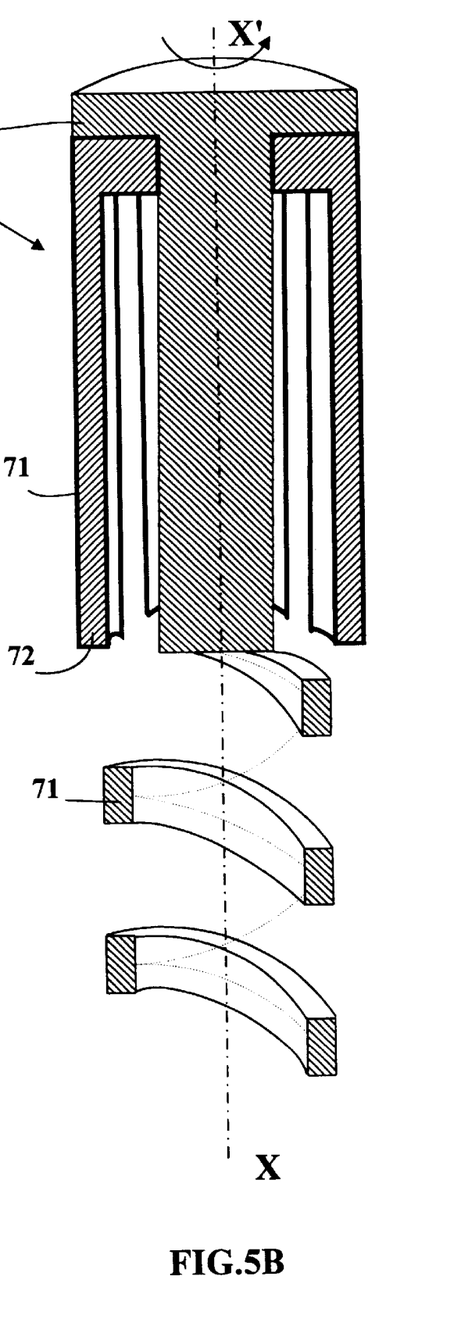

FIGS. 5A and 5B show perspective views of another variant of a molding element according to the invention for molding a cutout of generally cylindrical shape of axis XX' in a tread, said cutout defining a block of rubber, the lateral wall of which is provided with a plurality of rubber connecting bridges connecting said block to the tread.

In FIG. 5A, there is seen a molding element 70 intended to be fitted on a mold for molding a tread for a tire. This molding element 70, which is intended to mold a block of rubber of cylindrical geometry of axis referenced XX' in the rubber tread, comprises a first molding part 71 and a second molding part 72. The second molding part 72 is formed of a plurality of blades 73 extending substantially parallel to the direction of the axis XX'; these blades 73 are borne by a support 74. The first molding part 71 comprises a blade 75 wound helically around the axis XX', said blade 75 being borne by a cylindrical support 78 mounted passing through the support 74 of the second molding part 72.

According to the invention, the second molding part 72 is mounted to be mobile in translation in the direction XX' relative to the first molding part 71 so as to facilitate (i.e. reduce the demolding force) the extraction of said molding parts from a molded rubber tread.

In the molding configuration shown in FIG. 5A, the blades 73 are tangentially in contact with the blade 75 so as to define a plurality of orifices 76 for allowing the rubber to pass during the molding of a tread. The contacting of said blades 73 and 75 makes it possible to mold an incision defining a virtually cylindrical rubber block.

In a first stage of the demolding, the second molding part 72 is entrained in the direction of demolding and moves parallel to XX' relative to the first molding part 71 until it butts against a shoulder 77 provided on said molding part 71. Following this movement, a helical passage forms around XX' to allow passage of the connecting bridges molded in the orifices 76 during the following step during which the first molding part 71 comprising a helical blade and mounted to rotate freely relative to the second molding part 72 is driven both in translation and in rotation to be extracted from the molded tread.

In the molding element which has been described above, the demolding in a first stage comprises a movement of the first molding part relative to the second molding part, followed by a second stage during which said second part is extracted from the molded tread; it is also possible to conceive of the movements of the two molding parts taking place simultaneously.

Another variant of the molding element shown in FIGS. 5A and 5B consists in replacing the straight blades of the second molding part by blades which are also wound in a helix around XX', but in a direction of rotation opposite that of the blade(s) of the first molding part. In this variant, the first stage of demolding will be accompanied both by a rotational movement of one of the molding parts and by a translation relative to the other molding part. This structure of molding element makes it possible very substantially to reduce the forces to be applied to each molding element in order to effect demolding.

Generally, the molding elements according to the invention may advantageously be associated with mechanical means for entraining the mobile molding parts in their movement before or during the first stage of demolding.

We claim:

1. A molding element for equipping a part of a mold for molding a tread of a rubber mix for a tire, said mold part being displaced in a direction of molding/demolding XX', said molding element intended to mold a cutout in the tread being provided with at least two molding parts intended to project on the molding surface of said mold, each molding part being provided with lateral walls and end walls limiting the lateral walls, said molding parts being functionally arranged between them to define, in the molding configuration, at least one orifice intended for molding a rubber connecting bridge between the walls of the cutout, the molding element being characterized in that at least one molding part of said molding element is mounted to be mobile at least in translation in the direction of demolding XX' relative to the other molding parts so as to form, during the demolding, at least one passage of sufficient dimensions to permit the complete demolding of the molding element from the molded, vulcanized tread without breaking the connecting bridges.

2. A molding element according to claim 1, characterized in that in the molding position, the molding parts of the molding element are arranged such that one of the walls of a molding part, said molding part being mounted to be mobile relative to the molding part with which it defines at least one orifice, or in contact with one of the walls of the other molding part, the geometries of said walls in contact being functionally arranged to form at least one orifice passing through the molding element for molding a rubber connecting bridge, such that, under the action of the demolding forces, said molding parts are displaced relative to each other to create a passage of sufficient dimensions to permit the demolding of the rubber tread without breaking said rubber bridges.

3. A molding element according to claim 2, characterized in that the end walls of the molding parts of said molding element are in contact and in that said molding parts are mounted to be mobile relative to each other by sliding said end walls one on the other.

4. A molding element according to claim 2, characterized in that at least one of the mobile molding parts has a moving having both a component parallel to the direction of demolding XX' and a component perpendicular to this direction of demolding.

5. A molding element according to claim 3, characterized in that at least one of the mobile molding parts has a movement having both a component parallel to the direction of demolding XX' and a component perpendicular to this direction of demolding.

6. A molding element according to claim 4, characterized in that a portion of the end wall of a mobile molding part in contact with an end wall of another molding part with which it defines at least one orifice is formed of a part inclined at an angle $\alpha$ other than zero with the direction of demolding, said inclined part acting as a guide ramp for the displacement of said mobile molding part during demolding.

7. A molding element according to claim 2, characterized in that it comprises means for forcing at least one mobile molding part to move apart, in a direction perpendicular to the direction of demolding XX', from the molding part with which it defines at least one orifice, to form a passage of sufficient dimensions to permit demolding without breaking the rubber bridges.

8. A molding element according to claim 1, permitting the molding of a cutout of general cylindrical shape of axis XX', characterized in that it comprises:

- a first molding part formed of a cylindrical base bearing at least one blade winding around XX' in the form of a helix of the same axis, said molding part being capable of turning around XX' in particular under the action of the forces exerted by the rubber during demolding,
- at least one blade winding around XX' in the form of a helix of the same axis, said molding part being capable of turning around XX' in particular under the action of the forces exerted by the rubber during demolding,
- a second molding part comprising a cylindrical base extended by at least one blade arranged to form with the blade(s) of the first molding part at least one orifice for molding a rubber connecting bridge, said second molding part being mobile in the direction parallel to the direction XX' relative to the first molding part to permit, in the first demolding phase, the formation of at least one passage of sufficient dimensions to permit demolding of the second molding part by rotation thereof about XX' combined with a translational movement along XX'.

9. A molding element according to claim 8, characterized in that the second molding part bears at least one blade in the form of a helix around XX', said blade being wound in the opposite direction to the direction of winding of each helical blade borne by the first molding part, and in that said second part is able to move in the direction XX' relative to the first part.

10. A molding element according to claim 8, characterized in that elastic return means acting on the mobile parts of said element are provided to re-establish the form of the molding element in the molding configuration.

* * * * *

UNITED STATES PATENT AND TRADEMARK OFFICE
CERTIFICATE OF CORRECTION

PATENT NO.   : 6,318,983 B1
DATED        : November 20, 2001
INVENTOR(S)  : Lopez et al.

It is certified that error appears in the above-identified patent and that said Letters Patent is hereby corrected as shown below:

Column 1,
Line 17, "molding, an" should read -- molding an --
Line 51, "process." should read -- process, --

Column 3,
Line 8, "cc," should read -- α, --

Column 8,
Line 54, "moving" should read -- displacement --

Signed and Sealed this

First Day of April, 2003

JAMES E. ROGAN
*Director of the United States Patent and Trademark Office*